United States Patent
Begic et al.

(10) Patent No.: US 7,577,468 B2
(45) Date of Patent: Aug. 18, 2009

(54) EXCHANGEABLE COVERS FOR RADIO COMMUNICATION TERMINALS

(75) Inventors: Stjepan Begic, Malmö (SE); Stig Frohlund, Hässleholm (SE)

(73) Assignee: Sony Ericsson Mobile Communications AB, Lund (SE)

( * ) Notice: Subject to any disclaimer, the term of this patent is extended or adjusted under 35 U.S.C. 154(b) by 282 days.

(21) Appl. No.: 10/554,961

(22) PCT Filed: Apr. 5, 2004

(86) PCT No.: PCT/EP2004/050444

§ 371 (c)(1),
(2), (4) Date: Oct. 28, 2005

(87) PCT Pub. No.: WO2004/098160

PCT Pub. Date: Nov. 11, 2004

(65) Prior Publication Data

US 2007/0093140 A1    Apr. 26, 2007

Related U.S. Application Data

(60) Provisional application No. 60/468,431, filed on May 7, 2003.

(30) Foreign Application Priority Data

Apr. 29, 2003    (EP) .................................. 03445049

(51) Int. Cl.
*H04M 1/00*    (2006.01)
*H04M 9/00*    (2006.01)

(52) U.S. Cl. ................. 455/575.8; 455/575.1; 379/440; 379/433.11; 379/437

(58) Field of Classification Search ............ 379/428.01, 379/433.01, 433.11, 440, 437, 434; 455/575.1, 455/575.8
See application file for complete search history.

(56) References Cited

U.S. PATENT DOCUMENTS

| 5,946,395 | A | * | 8/1999 | Petrella et al. ......... 379/433.01 |
| 6,006,074 | A | * | 12/1999 | De Larminat et al. .... 455/575.1 |
| 2001/0024945 | A1 | | 9/2001 | Inomata et al. ............... 455/90 |

FOREIGN PATENT DOCUMENTS

| EP | 0 878 942 | 11/1998 |
| GB | 2 369 741 | 6/2002 |
| WO | WO 0046968 A1 * | 8/2000 |

OTHER PUBLICATIONS

International Preliminary Report on Patentability for PCT/EP2004/050444, Mar. 31, 2005.

* cited by examiner

*Primary Examiner*—Vincent P Harper
*Assistant Examiner*—Marivelisse Santiago-Cordero
(74) *Attorney, Agent, or Firm*—Myers Bigel Sibley & Sajovec

(57) ABSTRACT

A radio communication terminal, includes a substantially flat terminal core with a frame unit having two opposing faces, two opposing shorter sides and two opposing longer sides. The terminal includes a cover which is detachably connectable to the frame unit. The cover includes at least two cover members, devised to be assembled and disassembled in a predetermined order. One assembled cover member engages a previously assembled cover member. The previously assembled cover member is thereby more firmly attached. A cover member latches onto, and covers, a portion of one of the opposing faces, a second cover member engages with another cover member and covers another of the opposing faces and another cover member engages with and locks one of the cover members to the frame unit.

21 Claims, 12 Drawing Sheets

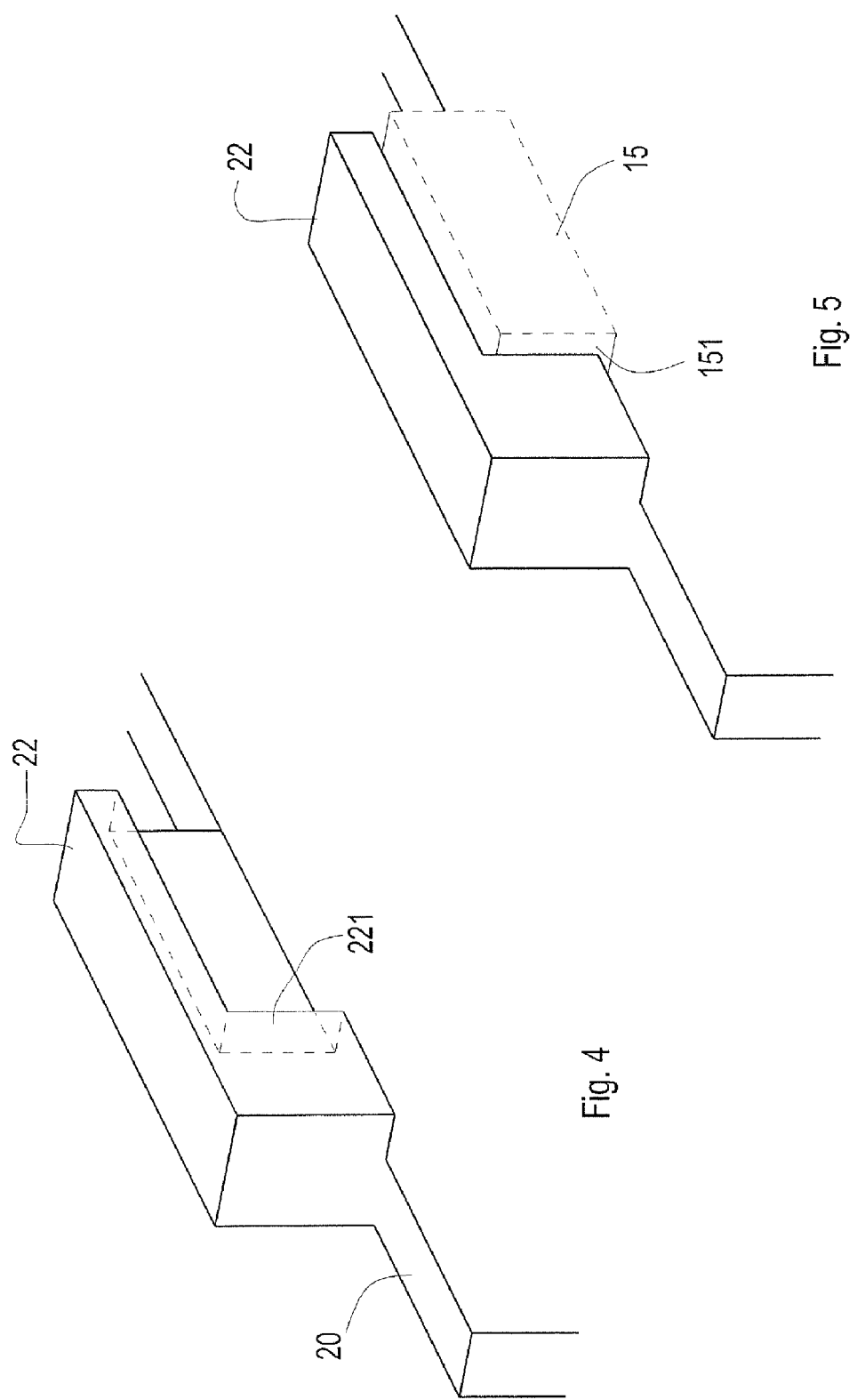

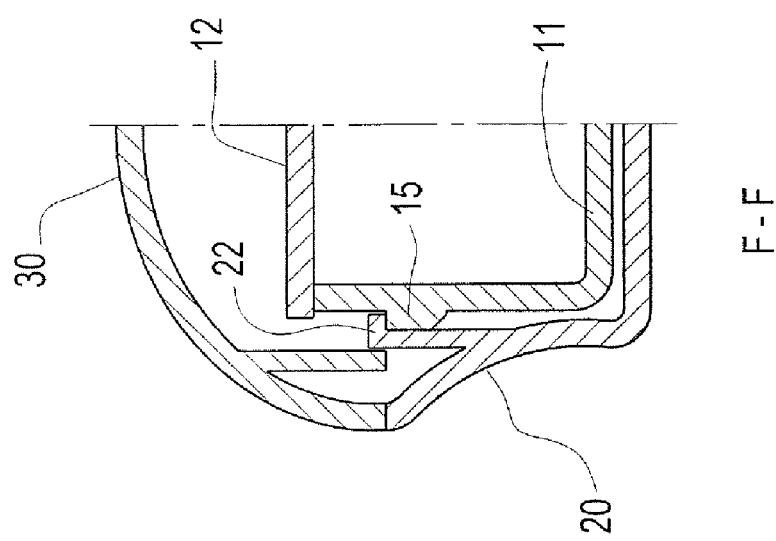
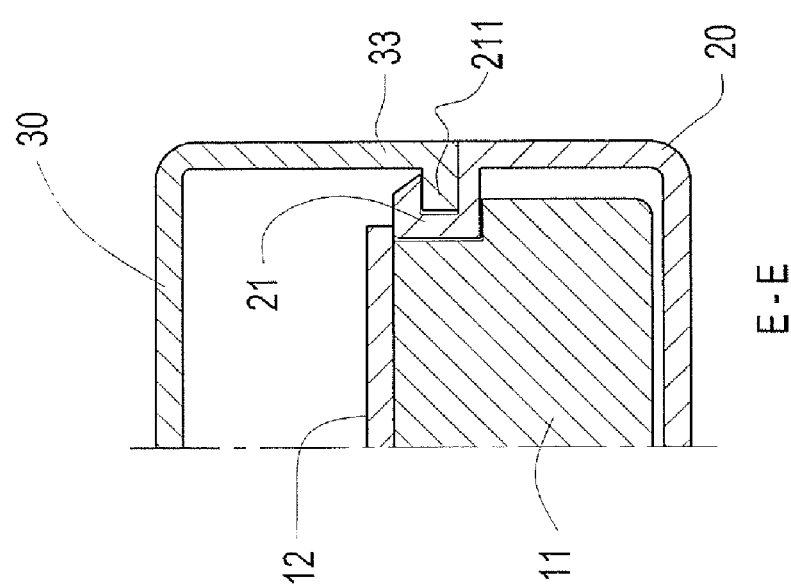

K-K

J-J

EXCHANGEABLE COVERS FOR RADIO COMMUNICATION TERMINALS

RELATED APPLCATIONS

The present application is a 35 U.S.C. §371 national phase application of PCT International Application No. PCT/EP 2004/050444, having an international filing date of Apr 5, 2004 and claiming priority to European Patent Application No. 03445049.4, filed Apr 29, 2003 and U.S. Provisional Application No. 60/468,431 filed May 7, 2003, the disclosures of which are incorporated herein by reference in their entireties. The above PCT International Application was published in the English language and has International Publication No. WO 2004/098 160.

FIELD OF THE INVENTION

The present invention relates generally to radio communication terminals having a detachable housing or cover, and to such detachable housings or covers. In particular, the invention relates to a concept for detachable and exchangeable covers, which guarantees firmly attached covers yet easy assembly and disassembly.

BACKGROUND

The first commercially attractive cellular telephones or terminals were introduced in the market at the end of the 1980's. Since then, a lot of effort has been made in making smaller terminals, with much help from the miniaturisation of electronic components and the development of more efficient batteries. Today, numerous manufacturers offer pocket-sized terminals with a wide variety of capabilities and services, such as packet-oriented transmission and multiple radio band coverage.

In order to attract customers the terminal manufacturers have therefore taken further measures to strengthen their position in the competition, one such being to offer terminals with detachable covers or covers. If a user wishes to change the outer appearance of his communication terminal, he can simply buy a new cover of the desired kind. The old cover is preferably released by a simple grip without the aid of tools, where after the new cover can be snapped on. A detachable cover is generally a fairly simple element, essentially formed from a single piece of plastic or possibly metal. The cover may represent only the front side of the terminal, i.e. the side of the terminal carrying the user interface generally comprising a terminal display and keypad, a microphone and a loudspeaker. In such a design, the cover forms a separate part of the cover of the terminal, or optionally an auxiliary part to be attached outside the cover. Alternatively, the cover may include more than one piece, e.g. a front piece and a back piece devised to substantially enclose the terminal. The detachable covers are often provided in different colours, and also with more advanced patterns such as logos or images.

The detachable covers of the prior art mainly create an aesthetic effect, changing the visual appearance of the terminal. However, the requirements on the detachable and exchangeable covers are usually conflicting. The covers are should be rigidly attached during usage, but be easily disassembled once the user chooses to chance to another set of covers. Preferably, disassembly of the covers should be possible without the need for any tools or similar.

A number of products that allow personalisation by exchanging covers are available on the market today, although the level of personalisation differs. The T300 by Sony Ericsson® features an exchangeable front cover, while the 8310 and the 6510 by Nokia® have exchangeable front covers as well as battery covers. These two Nokia phones are basically the same but with different cosmetic covers.

SUMMARY OF THE INVENTION

A problem related to this field is the somewhat conflicting requirement that a secure and solid assembly is desired, but at the same time it must be easy to change the covers. Once assembled, the exchangeable covers should be rigidly attached to the terminal core such that a solid product is obtained. Loosely attached covers will lower the quality impression of the entire terminal. Furthermore, squeaking or chirping plastic components may be extremely annoying, and even lower the audio performance of the terminal when held to the car. A related problem with prior art solutions is that the level of customisation is limited since not all visible parts of the phone, or terminal, are exchangeable. In the Nokia case above, a housing portion covering the antenna is part of a core of the terminal and hence identical in the two phones. This minimises the possibility to differentiate different products which are launched based on the same terminal core. Also this is to some extent a conflicting requirement, since including more exchangeable parts on the terminal means more mechanical interfaces between the different parts, and a greater challenge to provide a terminal which is easily assembled and disassembled, and at the same time solid once assembled.

Consequently, it is an object of the present invention to provide a solution for exchangeable covers for radio communication terminals, overcoming the aforementioned problems. In general terms, the proposed solution includes at least two, preferably three, different exchangeable cover members. In a preferred embodiment these are an antenna cover, a front cover and a battery cover. The covers are assembled to a terminal core comprising a frame unit. The present invention is based on the idea that the cover members have to be assembled and disassembled in a certain order, and where one assembled cover member will ensure that the cover member assembled before it is more firmly attached.

According to a first aspect, this object is fulfilled by a radio communication terminal, comprising a substantially flat terminal core with a frame unit having first and a second opposing faces, a first and a second opposing shorter sides and first and a second opposing longer sides, the terminal further comprising a cover which is detachably connectable to said frame unit. Said cover comprises at least two cover members, devised to be assembled and disassembled in a predetermined order, wherein one assembled cover member engages a previously assembled cover member, which previously assembled cover member thereby is more firmly attached.

In a preferred embodiment, a first cover member is devised to latch onto, and cover, a first portion of said first face, a second cover member is devised to engage with said first cover member and cover said second face, and a third cover member is devised to engage with and lock said second cover member to said frame unit.

Said third cover member preferably covers a second portion of said first face of the frame unit, which second portion is complementary to said first portion of said first face of said frame unit.

In one embodiment, said first cover member is to engage with said first shorter side and said longer sides of said frame unit.

Furthermore, said first cover member may be devised to hook into a notch at said first shorter side and pivotably latch into engagement with attachment means at said longer sides of said frame unit.

In a version thereof, said attachment means comprises a shoulder portion cooperating with an attachment member on said first cover member for maintaining engagement between said first cover member and said frame unit.

In one embodiment, said second cover member is devised to hook onto and engage about said first cover member at said first shorter side.

Said second cover member may be devised to pivotably latch into connection with retaining means at said longer sides of said frame unit.

Furthermore, said second cover member may comprise a protruding member devised to cooperate with a recess in said frame unit for maintaining engagement between said second cover member and said frame unit In one embodiment, said third cover member is devised to slide along said first face into a cooperating rim and groove engagement with said second cover member from said second shorter side for maintaining engagement between said third cover member and said frame unit.

Said second and third cover members may engage adjacent to said longer sides of said frame unit.

Also, said second and third cover members may engage adjacent to second shorter side of said frame unit.

In one embodiment, said third cover member comprises a latch member devised to engage with cooperating latch means on said frame unit adjacent to said first cover member.

In a version thereof, said latch member projects underneath said first cover member.

In a preferred embodiment, said first cover member is devised to cover an antenna portion, said second cover member is devised to cover a front portion, and said third cover member is devised to cover a battery portion, of said terminal.

According to a second aspect, the object of the invention is fulfilled by a frame unit for use with detachably connectable covers in a radio communication terminal being devised with any of the features listed above.

According to a third aspect, the object of the invention is fulfilled by a set of first, second and third cover members which are detachably connectable to a frame unit in a radio communication terminal being devised with any of the features listed above.

According to a third aspect, the object of the invention is fulfilled by a cover member which is detachably connectable to a frame unit in a radio communication terminal being devised with any of the features listed above, as said first cover member.

According to a fourth aspect, the object of the invention is fulfilled by a cover member which is detachably connectable to a frame unit in a radio communication terminal being devised with any of the features listed above, as said second cover member.

According to a fifth aspect, the object of the invention is fulfilled by a cover member which is detachably connectable to a frame unit in a radio communication terminal being devised with any of the features listed above, as said third cover member.

BRIEF DESCRIPTION OF THE DRAWINGS

The features and advantages of the present invention will be more apparent from the following description of the preferred embodiments with reference to the accompanying drawings, on which FIG. 1 schematically illustrates a disassembled radio communication terminal with a core comprising a frame unit, and three detachable cover members, in accordance with an embodiment of the invention;

FIG. 4 illustrates a close-up of an attachment member of said first cover member;

FIG. 5 illustrates a close-up of said attachment member in cooperative engagement with attachment means on said frame unit;

FIG. 8 illustrates a cross-sectional view of a part of said frame unit, and the first and second cover members, at a shorter side portion of the frame unit;

FIG. 9 illustrates a cross-sectional view of a part of said frame unit, and the first and second cover members, at a longer side portion of the frame unit;

DETAILED DESCRIPTION OF PREFERRED EMBODIMENTS

The present description relates to the field of radio communication terminals. The term radio terminal or communication terminal, also denoted terminal in short in this disclosure, includes all mobile equipment devised for radio communication with a radio station, which radio station also may be mobile terminal or e.g. a stationary base station. Consequently, the term radio terminal includes mobile telephones, pagers, communicators, electronic organisers, smartphones, PDA:s (Personal Digital Assistants) and DECT terminals (Digital Enhanced Cordless Telephony). Hence, although the structure and characteristics of the antenna design according to the invention is mainly described herein, by way of example, in the implementation in a mobile phone, this is not to be interpreted as excluding the implementation of the inventive antenna design in other types of radio terminals, such as those listed above. Furthermore, it should be emphasised that the term comprising or comprises, when used in this description and in the appended claims to indicate included features, elements or steps, is in no way to be interpreted as excluding the presence of other features elements or steps than those expressly stated.

Exemplary embodiments will now be described with references made to the accompanying drawings.

According to the invention, a final terminal product includes a terminal core with a frame unit, or chassis, and two or more cover members which are detachably connectable to the frame unit An important merit with this invention is the reduction in development time and resources for each product By using a flexible core terminal concept and attachable covers, it is feasible to have several products out on the market almost to the cost of one development project. Regulations like type approval need only to be done once, for the core terminal, as the basic functionality such as the radio characteristics will be the same.

The terminal core includes the basic features and elements of a radio communication terminal, and is preferably fully operable without the releasable cover. In one embodiment, the releasable cover is active and does not only have a protective and aesthetic purpose, but also a functional one. Such active covers may include a functional member e.g. including electronics that together with the terminal or phone provides additional and/or modified functions. In such an embodiment, the terminal core is provided with a cover connector, connectable to a co-operating terminal connector on the releasable cover. Furthermore, means for attaching and securing the cover or covers to the terminal are also included, devised in a co-operating manner.

The present invention relates to a solution for rigidly connecting a cover to a terminal core, which cover is still easily detachable. A preferred embodiment of this invention will be described below with reference to FIGS. 1-13.

Figure 1:
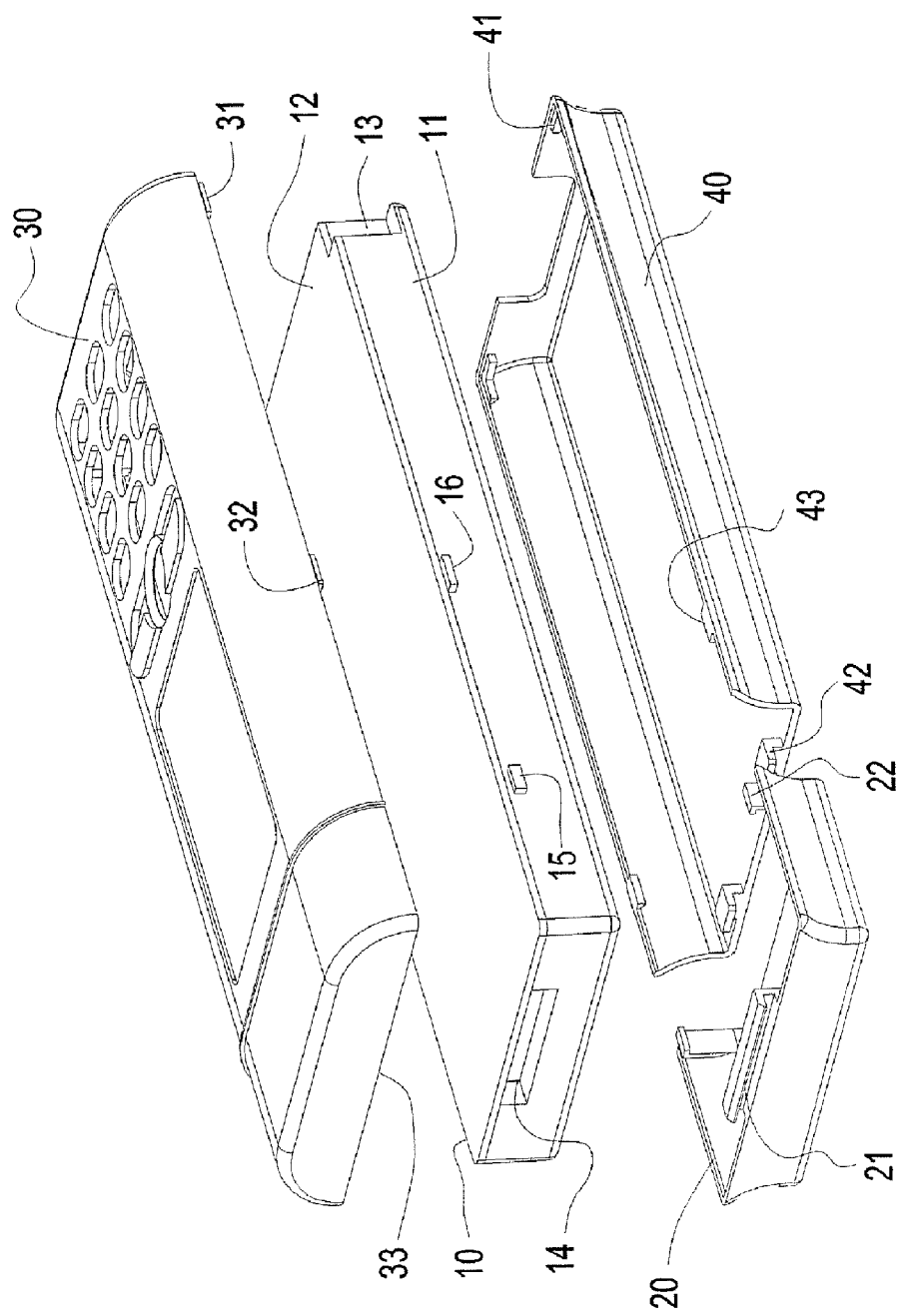

FIG. 1 illustrates an elevated view of a terminal core 10 comprising a frame unit 11 and a Printed Circuit Board PCB 12. Frame unit 11 acts as a chassis to terminal core 10, directly or indirectly supporting other components of the terminal. These components are not shown in the Figs, but may typically include a user input interface, such as a microphone and a keypad or a touch-sensitive display. Furthermore, a user output interface of terminal core 10 comprises a loudspeaker and a display. All of these features are well known in the prior art. Terminal core 10 further includes an antenna, radio transmission and reception electronics, and a power supply preferably in the form of a battery. In the displayed embodiment, the antenna is arranged in the thicker, left side portion of terminal core 10. Room for the battery is also defined beside the antenna, i.e. to the right in the drawing, though no battery is included in the drawing. The terminal is also devised with a computer system, including a microprocessor with associated memory and software.

A first cover member 20 is devised to cover a first portion of a rear face of terminal core 10, more particularly an antenna portion. A second cover member 30 is devised to cover a front face of terminal core 10, preferably carrying said user interfaces. In the shown schematic illustration of the preferred embodiment, recesses are formed in front cover 30, for fittingly receiving keys of the user input interface. Furthermore, front cover 30 includes a transparent portion above the key receiving recesses, i.e. to the thereof left in the drawing. A third cover member 40 is devised to cover a battery portion of terminal core 10.

All in all, the three covers 20, 30 and 40 are devised to cover the main part of the terminal. At the bottom shorter side of the terminal, facing right in the drawing, the terminal core 10 comprises a connector, which is why the battery cover 40 is recessed there.

The following drawings illustrate how the terminal according to the preferred embodiment of the invention is assembled. Where reference markings are not included in certain drawings, these can be found in FIG. 1.

Figure 2:
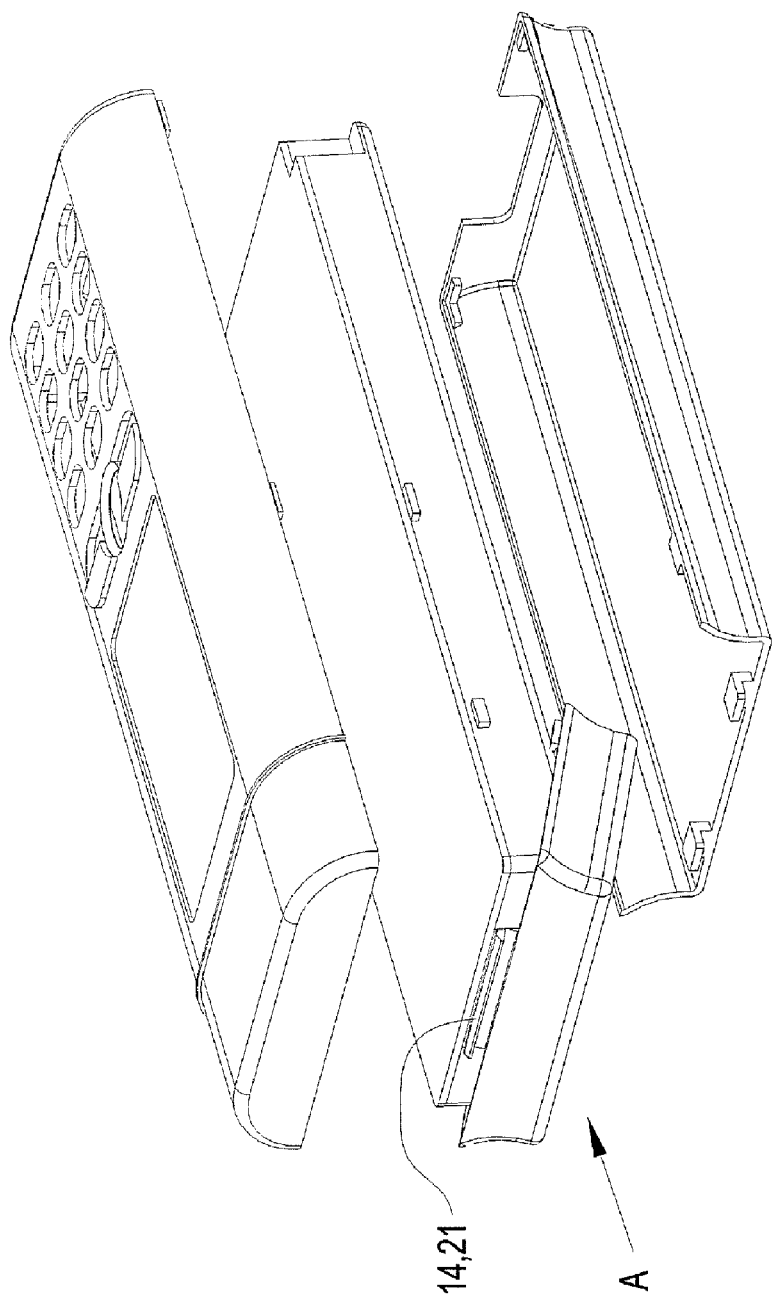
FIG. 2 illustrates a first step of attachment of a first cover member on said frame unit.

FIG. 2 illustrates a first step of connecting the antenna cover 20 to the frame unit 11 of terminal core 10. The franc unit 11 comprises a notch 14 at a first shorter side adjacent to the antenna. Antenna cover 20 has a cooperating hook member 21, devised to hook into notch 14. This fixes the end of antenna cover 20, carrying hook member 21, to the frame unit 11 in all directions but opposite the assembly direction indicated by arrow A.

Figure 3:
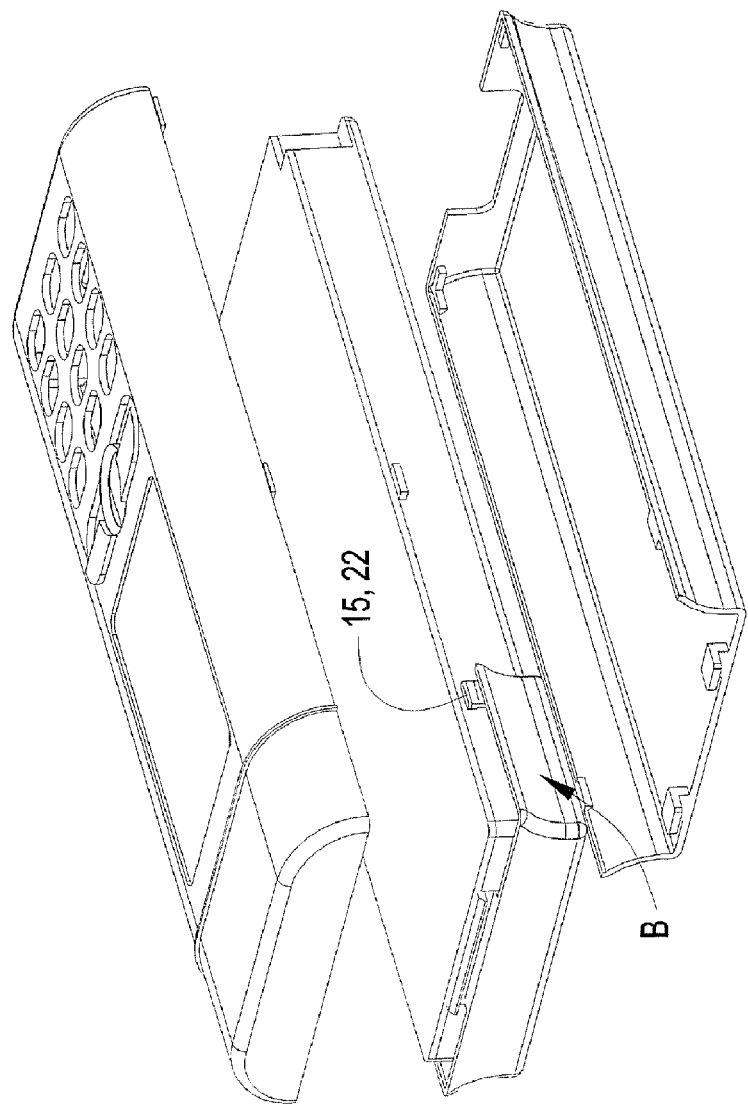
FIG. 3 illustrates a second step of attachment of said first cover member on said frame unit.

FIG. 3 illustrates the subsequent step, at which an attachment member 22 latches into engagement with attachment means 15 at a longer side portion of frame unit 11, by means of pivoting antenna cover 20 about the engagement point defined by cooperating members 14 and 21, as indicated by arrow B.

FIGS. 4 and 5 illustrates a specific embodiment of the terminal shown in FIG. 3, showing attachment member 22 from the terminal side of antenna cover 20. In this specific embodiment, attachment member 22 has an edge portion 221, on the farther side of attachment member 22, as seen from hook member 21. FIG. 5 shows how attachment means 15 comprises a protruding member 15 having a shoulder portion 151 which cooperates, when antenna cover 20 is attached, with edge portion 221. The dashed line in FIG. 5 indicates where protruding member 15 connects to frame unit 11, the protruding member 15 preferably being integrated with frame unit 11. By means of the features of FIGS. 4 and 5, antenna cover 20 cannot be disconnected from the terminal core 10 by a longitudinally displacement.

Although FIGS. 4 and 5 illustrate more or less complete fixation of antenna cover 20, this is not mandatory. Even if cooperating shoulder portion 151 and edge portion 221 are dispensed with, antenna cover 20 is still retained in the longitudinal direction by means of front cover 30.

Figure 6:
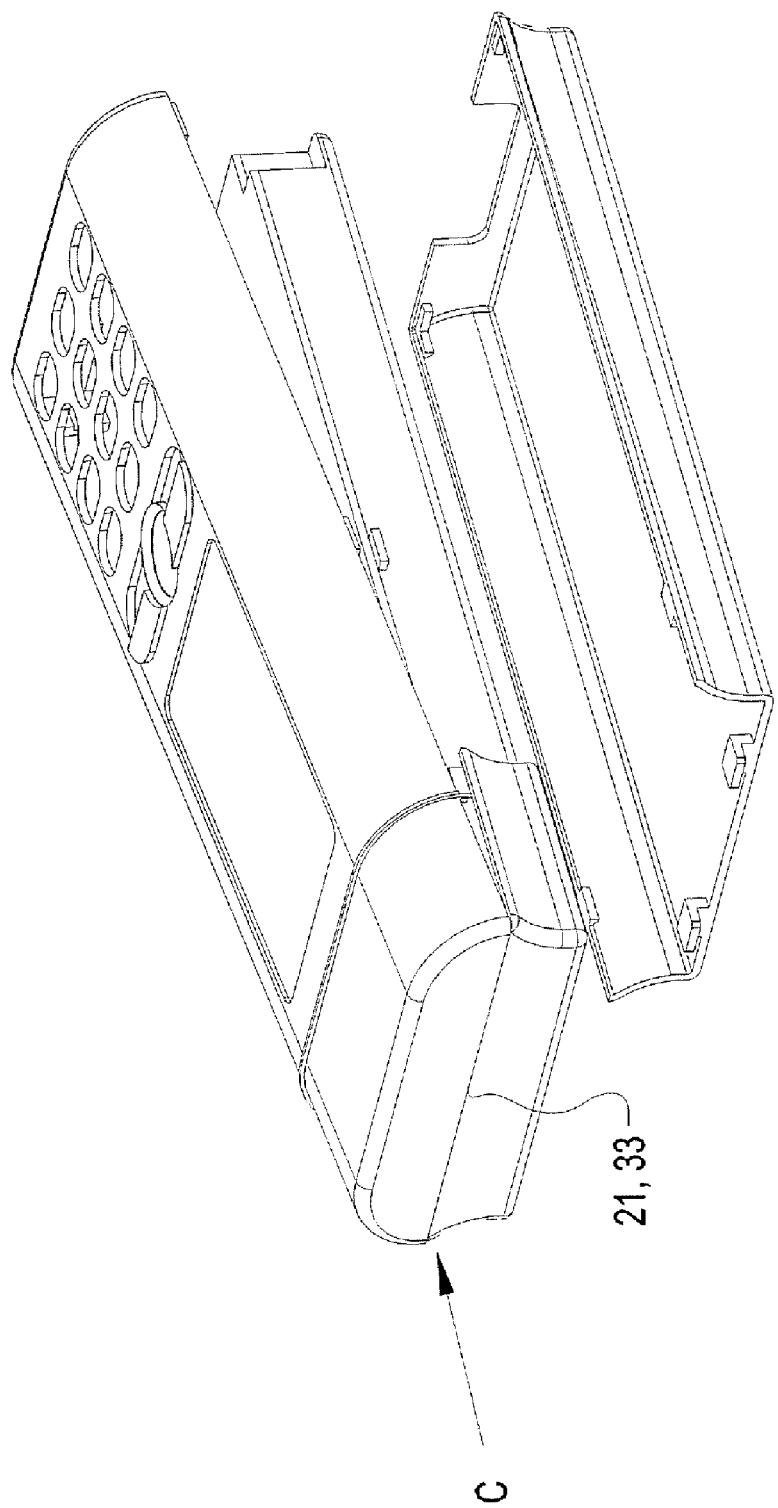
FIG. 6 illustrates a first step of attachment of a second cover member on said frame unit.

FIG. 6 illustrates a first step of connecting the front cover 30. As will be shown in more detail below, front cover 30 engages about antenna cover 20 at the shorter side of the terminal, thereby exerting a retaining force in the direction indicated by arrow C on the antenna cover 20.

Figure 7:
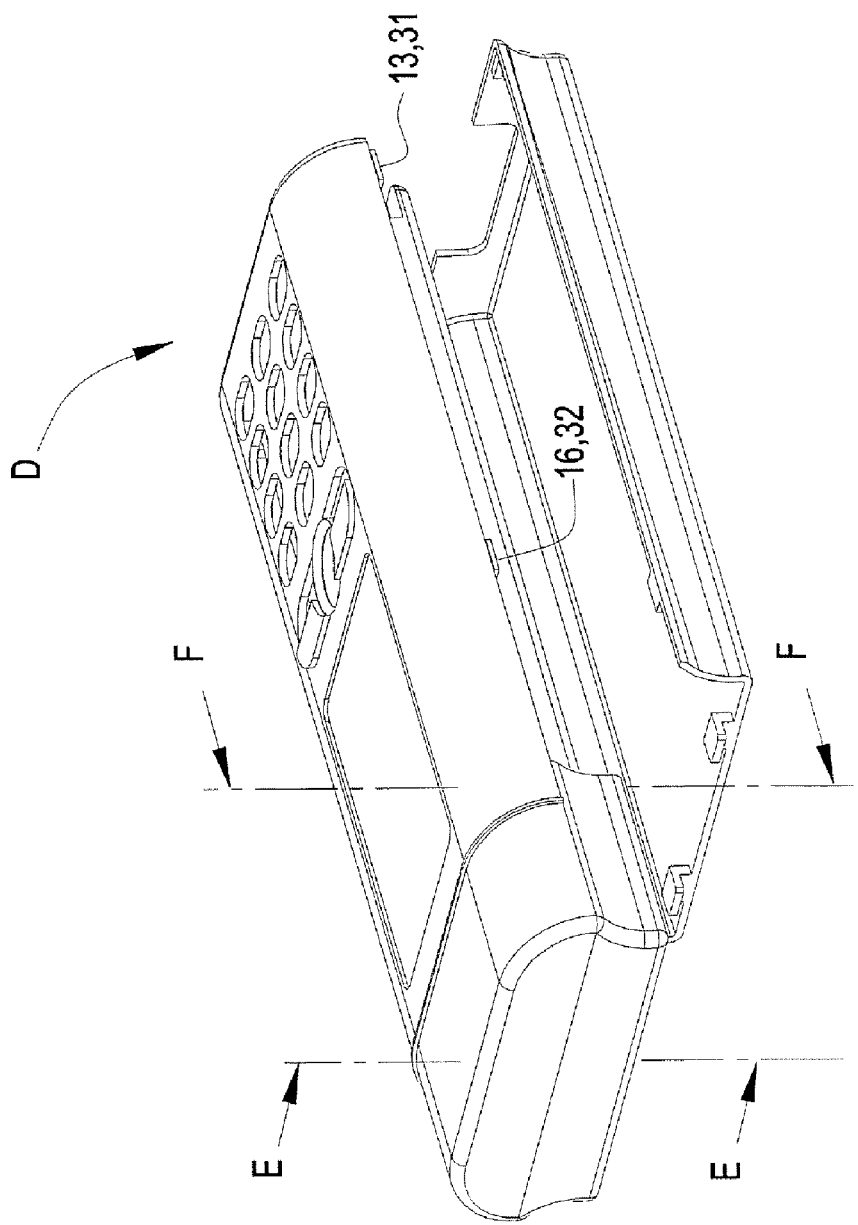
FIG. 7 illustrates a second step of attachment of said second cover member on said frame unit.

FIG. 7 illustrates the second step for attaching front cover 30. At the second shorter end of the terminal, opposing said first shorter end, front cover 30 comprises a protruding member 31, devised to cooperate with a recess 13 in the frame unit 11, and the protruding member 31 is received in recess 13 by pivoting front cover 30 about its engagement with antenna cover 20 at said first shorter side, as indicated by arrow D. This way, front cover 30 is prevented from movement relative the frame unit in the longitudinal direction, and in turn, antenna cover 30 acts to maintain engagement between antenna cover 20 and frame unit 11. In a preferred embodiment, retaining means 16 are arranged at the longer sides of frame unit 11, preferably arranged as a rim 16. Furthermore, front cover 30 is devised with a retaining member 32, arranged to latch into engagement with rim 16 when front cover 30 is pivoted into connection with frame unit 11. As will be explained, retaining means 16 are not mandatory, but are useful. For one thing, when front cover 30 is attached, the transparent portion thereof engages the display of the terminal core 10, with an intermediate seal. The front cover 30 is preferably biased against this seal, and for the sake of easy assembly it is advantageous to be able to latch the front cover 30 onto frame unit 11, before finally attaching battery cover 40.

FIGS. 8 and 9 show parts of two different cross-sections of the terminal as illustrated in FIG. 7.

FIG. 8 shows a cross-section of the terminal at said first shorter side of frame unit 11. This drawing shows how hook member 21 engages into notch 14 of the frame unit 11. Furthermore, hook member 21 has an outer trace 211, into which a hook portion 33 of said front cover 30 engages, for maintaining engagement of both front cover 30 and antenna cover 20 with frame unit 11 at said first shorter side.

FIG. 9 illustrates a cross-section of the terminal at one of the longer sides of frame unit 11, at the portion shown in FIG. 5. Preferably, the two longer sides are identical. This drawing shows how attachment member 22 engages with protruding member 15 of frame unit 11.

Figure 10:
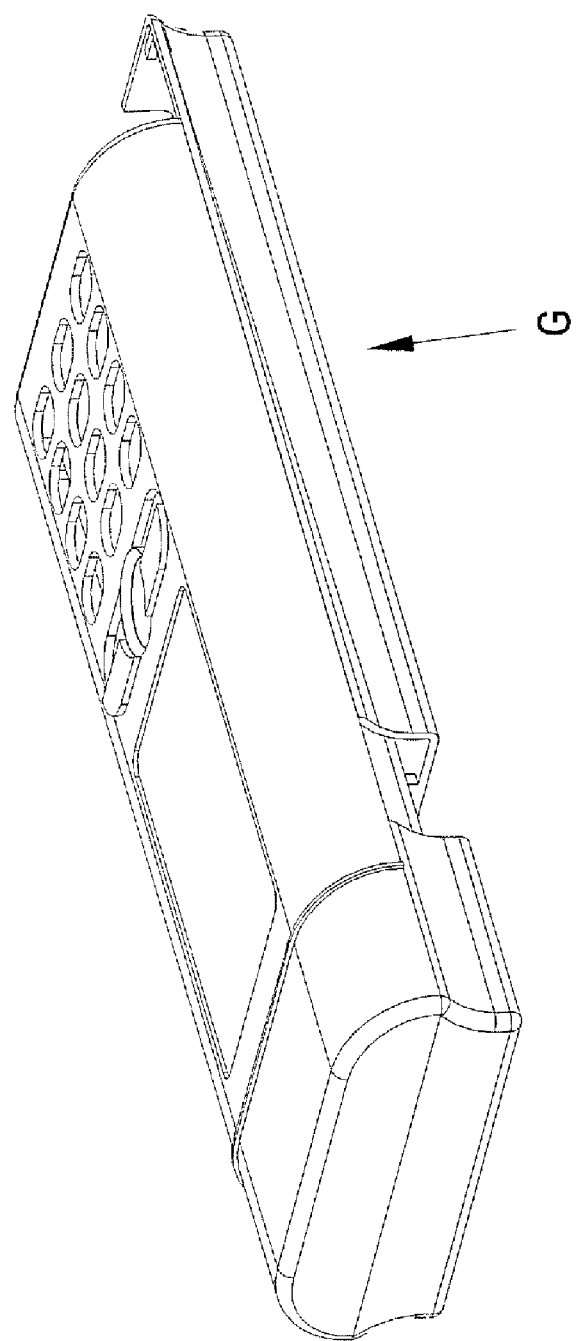
FIG. 10 illustrates a first step of attachment of a third cover member on said frame unit.

FIG. 10 illustrates a first step of connecting the battery cover 40 to frame unit 11. Battery cover 40 is slid onto the terminal. In one embodiment, engagement may be achieved by sliding battery cover all the way from the second shorter side of frame unit 11, but in the illustrated embodiment a bayonet coupling is used. Accordingly, battery cover 40 is first placed directly onto the frame unit 11 at a position spaced apart from antenna cover 20, as indicated by arrow G.

Figure 11:
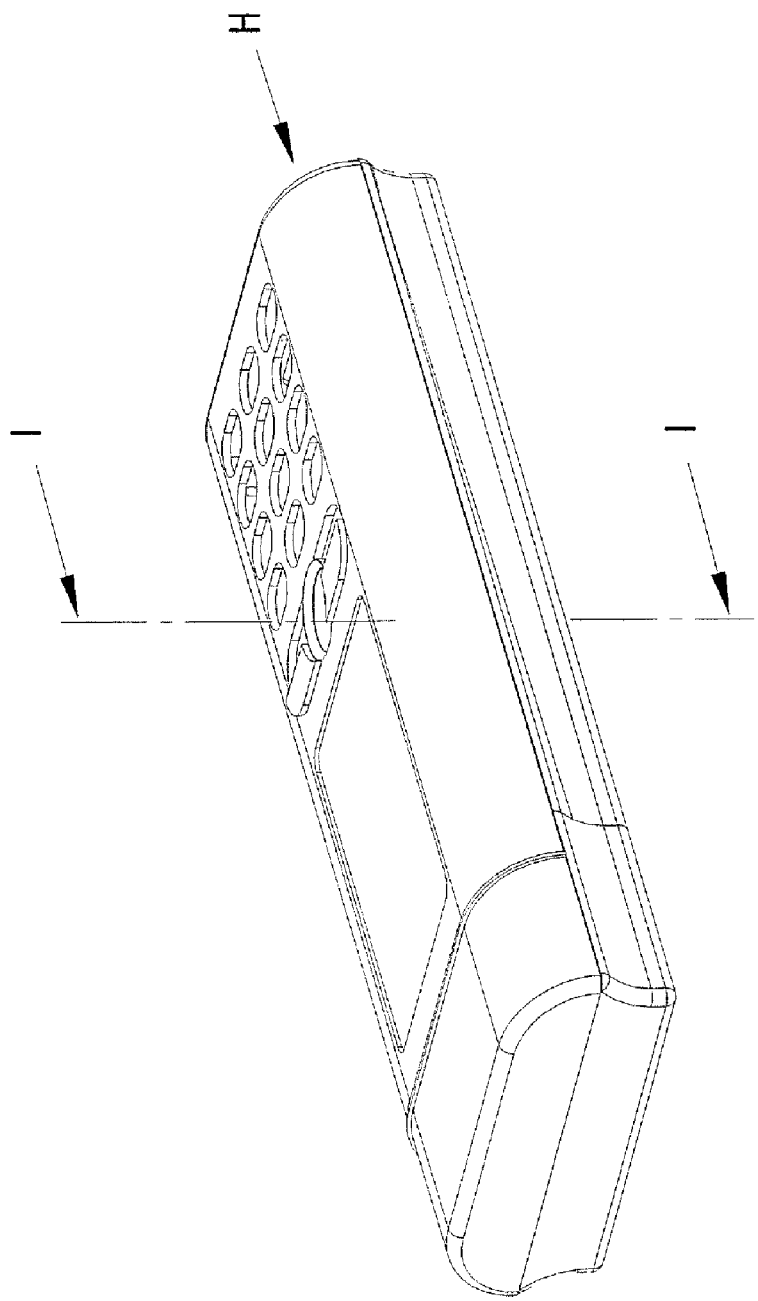
FIG. 11 illustrates a second step of attachment of said third cover member on said frame unit.

FIG. 11 illustrates the second step for attaching battery cover 40, which is performed by sliding it towards antenna cover 20. Preferably, battery cover 40 and antenna cover 20, cover complementary parts of the rear face of terminal core 10.

Figure 12:
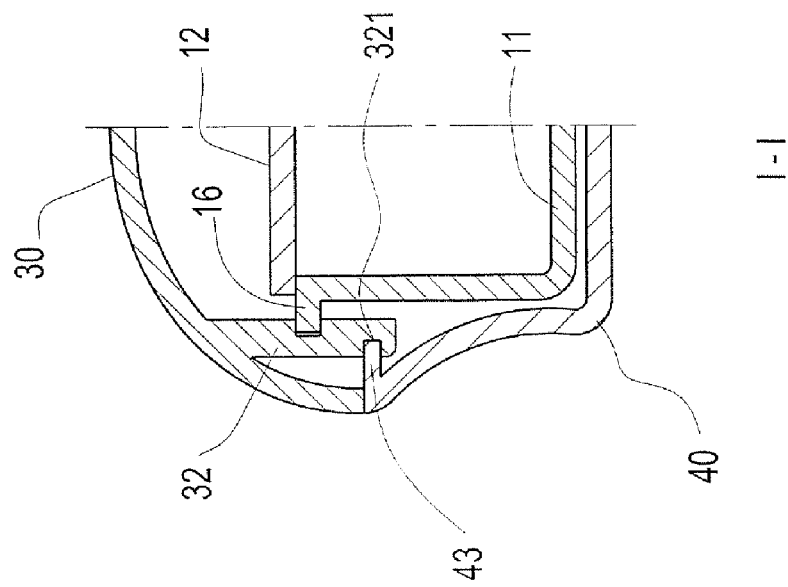
FIG. 12 illustrates a cross-sectional view of a part of the assembled terminal, showing the frame unit and the second and third cover members, at a longer side portion of the frame unit.

FIG. 12 illustrates a cross-section of the terminal at one of the longer sides of frame unit 11, as illustrated in FIG. 11. This drawing shows how retaining member 32 of front cover 30 engages about rim 16 of frame unit 11. Furthermore, retaining member 32 is devised with a groove 321, cooperating with a rim 43 projecting inwards from side of said battery cover 40. Apart from the engagement at the longer sides with cover member 30, battery cover 40 engages with the front cover 30 at the second shorter side and with the frame unit 11 adjacent to the antenna cover 20, as will be more clearly illustrated.

Figure 13:
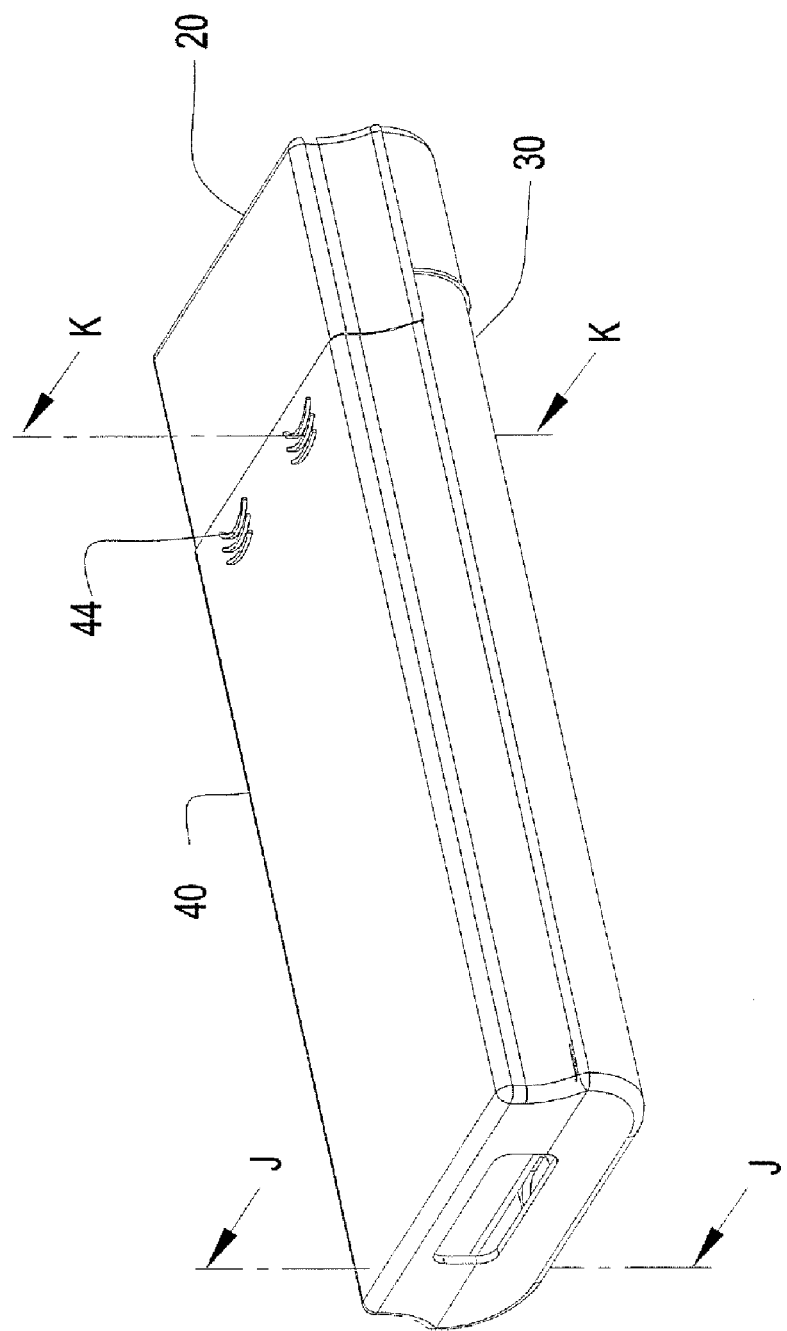
FIG. 13 illustrates the assembled terminal from an opposite direction compared to FIG. 10.

FIG. 13 illustrates the assembled terminal with its rear face upwards and the first shorter side to the right The battery cover 40 comprises latch means 42, devised to engage with cooperating latch means 17 on the frame unit 11. For detaching the battery cover, a marked portion 44 is pressed down, releasing the engagement with frame unit 11. Portion 44 may comprise a friction-increasing surface, such as a surface structure.

Figure 14:
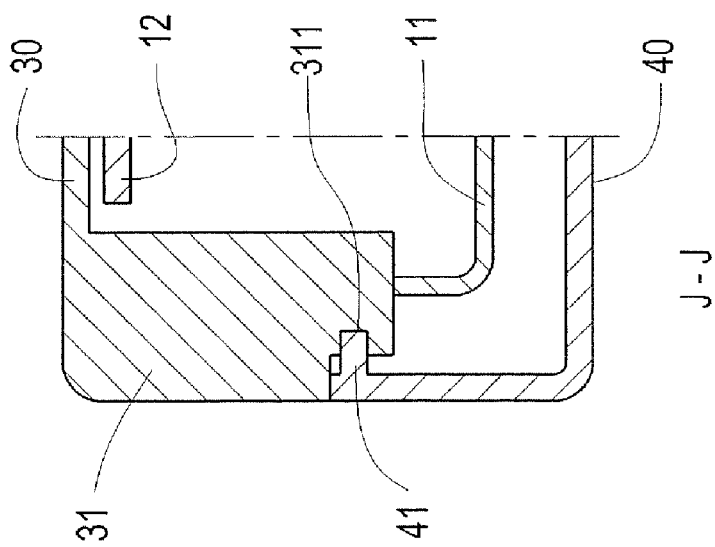
FIG. 14 illustrates a cross-sectional view of a part of the assembled terminal, showing the frame unit and the second and third cover members, at a shorter side portion of the frame unit.

FIG. 14 illustrates a cross-section of the terminal at a corner portion of the second shorter side of frame unit 11, as illustrated in FIG. 13. Protruding member 31 of front cover 30 is received in recess 13, though not specifically shown in this drawing. A rim 41 projects inwards from the battery cover at said second shorter side, and cooperates with a recess 311 in protruding member 31. This way battery cover 40 engages about front cover 30.

Figure 15:
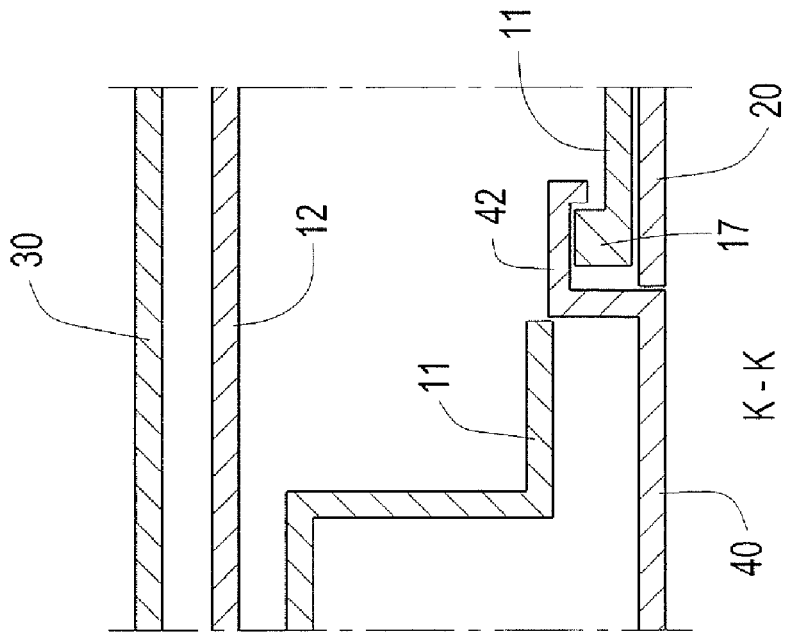
FIG. 15 illustrates a cross-sectional view of a part of the assembled terminal, showing the frame unit and the first, second and third cover members, at a portion of the frame unit.

FIG. 15 illustrates a cross-section of the terminal through the latch connection between battery cover 40 and frame unit 11, as illustrated in FIG. 13. Latch member 42 projects underneath antenna cover 20, in the direction towards the first shorter side. Under antenna cover 20, latch member 42 engages with latch means 17 of frame unit 11, and battery cover 40 is automatically latched and locked in place when displaced into connection with antenna cover 20.

In accordance with the invention, a rigidly assembled terminal obtained by arranging the terminal core 10 and the covers 20,30,40 such that they have to be assembled in a certain predetermined order. In short, the assembly procedure starts with the antenna cover 20, which is hooked and snapped to the frame unit 11. In this state, the antenna cover 20 is easily disassembled. Next the front cover 30 is hooked on, preventing the antenna cover 20 from coming loose. In this state the front cover is easily disassembled while the antenna cover 20, partly covered by the front cover 30, will not come loose until the front cover 30 is removed. Next the battery cover 40 is assembled by sliding it in place. The battery cover 40 will hook on to the front cover 30 in the lower corners, at the second shorter side, preventing the front cover 30 from coming loose. The battery cover 40 is locked in place with snap features 42,27 to the frame unit 11.

By using three separate covers, a high level of personalisation can be offered to the customer. Similarly, the internal terminal core 10 can be reused in different products and still be perceived as different by the customer, such as a sport version with thicker covers.

The cover members are firmly attached to the terminal core 10, yet easily disassembled once the user wants to exchange them. The battery cover is removed by a sliding motion, which is well known and accepted among users. Once the battery cover 40 is removed, the front cover 30 can easily be removed followed by the antenna cover.

The principles of the present invention have been described in the foregoing by examples of embodiments or modes of operations. However, the invention should not be construed as being limited to the particular embodiments discussed above, which are illustrative rather than restrictive, and it should be appreciated that variations may be made in those embodiments by persons skilled in the art, without departing from the scope of the present invention as defined by the appended claims.

The invention claimed is:

1. A radio communication terminal, comprising:
   a flat terminal core with a frame unit having first and a second opposing faces;
   a first and a second opposing shorter sides and first and a second opposing longer sides;
   the terminal further comprising first, second and third cover members which are detachably connectable to the frame unit, wherein:
   the first, second and third cover members are configured to be assembled and disassembled in a predetermined order, wherein:
   the first cover member is configured to latch onto the frame unit and cover a first portion of the first face;
   the second cover member is configured to engage with the first cover member and cover the second face at an engagement location; and
   the third cover member is configured to attach to the frame unit and to further engage with and lock the second cover member to the frame unit, wherein the terminal core is fully operable without the first, second and third cover members, wherein the second cover member includes a protruding member configured to cooperate with a recess in the frame unit and to be received in the recess when the second cover member pivots around the engagement location of the second cover member with the first cover member.

2. The radio communication terminal as recited in claim 1, wherein the third cover member covers a second portion of the first face of the frame unit.

3. The radio communication terminal as recited in claim 2, wherein the second portion is complementary to the first portion of the first face of the frame unit.

4. The radio communication terminal as recited in claim 1, wherein the first cover member is configured to engage with the first shorter side and the longer sides of the frame unit.

5. The radio communication terminal as recited in claim 1, wherein the first cover member is configured to hook into a notch at the first shorter side and pivotably latch into engagement with attachment means at the longer sides of the frame unit.

6. The radio communication terminal as recited in claim 5, wherein the attachment means comprises a shoulder portion cooperating with an attachment member on the first cover member for maintaining engagement between the first cover member and the frame unit.

7. The radio communication terminal as recited in claim 1, wherein the second cover member is configured to hook onto and engage about the first cover member at the first shorter side.

8. The radio communication terminal as recited in claim 7, wherein the second cover member is configured to pivotably latch into connection with retaining means at the longer sides of the frame unit.

9. The radio communication terminal as recited in claim 7, wherein the second cover member comprises a protruding member configured to cooperate with a recess in the frame unit for maintaining engagement between the second cover member and the frame unit.

10. The radio communication terminal as recited in claim 1, wherein the third cover member is configured to slide along the first face into a cooperating rim and groove engagement with the second cover member from the second shorter side for maintaining engagement between the third cover member and the frame unit.

11. The radio communication terminal as recited in claim 10, wherein the second and third cover members engage adjacent to the longer sides of the frame unit.

12. The radio communication terminal as recited in claim 10, characterised in that the second and third cover members engage adjacent to second shorter side of the frame unit.

13. The radio communication terminal as recited in claim 10, wherein the third cover member comprises a latch member devised to engage with cooperating latch means on the frame unit, adjacent to the first cover member.

14. The radio communication terminal as recited in claim 13, wherein the latch member projects underneath the first cover member.

15. The radio communication terminal as recited in claim 1, wherein the first cover member is configured to cover an antenna portion, the second cover member is configured to cover a front portion, and the third cover member is configured to cover a battery portion of the terminal.

16. The radio communications terminal as recited in claim 1, wherein the first, second and third covers are exchangeable.

17. The radio communication terminal as recited in claim 1, wherein the third cover member comprises snap features configured to engage with the frame unit and lock the third cover member to the frame unit.

18. The radio communication terminal as recited in claim 1, wherein the first cover member further comprises an attachment member having an edge portion, the frame unit further comprises a protruding member having a shoulder portion that cooperates with the edge portion of the attachment member of the first cover member such that the first cover member cannot be disconnected from the terminal core by longitudinal displacement.

19. A method of assembling a radio communication terminal, the method comprising:
providing a flat terminal core with a frame unit having first and second opposing faces;
providing first and second opposing shorter sides and first and second opposing longer sides;
providing first, second and third cover members which are detachably connectable to the frame unit,
latching the first cover member onto the frame unit to cover a first portion of the first face;
then engaging the second cover member with the first cover member at an engagement location to cover the second face, wherein the second cover member includes a protruding member configured to cooperate with a recess in the frame unit; and then
attaching the third cover member with the frame unit and further engaging the third cover member with and locking the second cover member to the frame unit wherein locking the second cover member to the frame unit comprises pivoting the second cover member around the engagement location of the second cover member with the first cover member to engage the protruding member of the second cover member with the recess in the frame unit.

20. The method of claim 19, wherein the third cover member comprises snap features, wherein attaching the third cover member to the frame unit comprises engaging the snap features with the frame unit such that the third cover member is locked to the frame unit.

21. The method of claim 19, wherein the first cover member further comprises an attachment member having an edge portion, the frame unit further comprises a protruding member having a shoulder portion that cooperates with the edge portion of the attachment member of the first cover member such that the first cover member cannot be disconnected from the terminal core by longitudinal displacement.

* * * * *